United States Patent
Silcock et al.

(10) Patent No.: US 7,425,818 B2
(45) Date of Patent: Sep. 16, 2008

(54) APPARATUS FOR CONNECTING A PRIME MOVER DRIVEN ALTERNATOR TO A CIRCUIT WITH AN EXISTING ALTERNATING CURRENT

(75) Inventors: Roger Stuart Silcock, Peterborough (GB); Jonathan James Childs, Peterborough (GB); Jarlath Michael McEntee, Castine, ME (US)

(73) Assignee: Microgen Energy Limited, Reading (GB)

( * ) Notice: Subject to any disclaimer, the term of this patent is extended or adjusted under 35 U.S.C. 154(b) by 61 days.

(21) Appl. No.: 10/587,708

(22) PCT Filed: Feb. 2, 2005

(86) PCT No.: PCT/GB2005/000380

§ 371 (c)(1),
(2), (4) Date: Jul. 28, 2006

(87) PCT Pub. No.: WO2005/076429

PCT Pub. Date: Aug. 18, 2005

(65) Prior Publication Data

US 2007/0120744 A1    May 31, 2007

(30) Foreign Application Priority Data

Feb. 5, 2004    (GB) ................... 0402587.0

(51) Int. Cl.
*H02H 7/06*    (2006.01)
*H01R 43/00*    (2006.01)

(52) U.S. Cl. .............. 322/29; 322/23; 322/37; 29/854

(58) Field of Classification Search ............. 322/14, 322/15, 22, 23, 29, 37; 29/854, 622
See application file for complete search history.

(56) References Cited

U.S. PATENT DOCUMENTS

| | | | |
|---|---|---|---|
| 5,998,976 A | * | 12/1999 | Steffan ............ 322/10 |
| 7,080,449 B2 | * | 7/2006 | Aldridge et al. ...... 29/854 |
| 2005/0194940 A1 | * | 9/2005 | Aldridge et al. ...... 322/23 |

FOREIGN PATENT DOCUMENTS

| | | |
|---|---|---|
| GB | 695288 | 8/1953 |
| GB | 2 360 402 | 9/2001 |
| JP | 08098407 | 4/1996 |
| WO | WO 01/69078 | 9/2001 |

* cited by examiner

*Primary Examiner*—Nicholas Ponomarenko
(74) *Attorney, Agent, or Firm*—Needle & Rosenberg, P.C.

(57) ABSTRACT

The present invention provides a connector arrangement operative to connect a prime mover driven alternator to an alternating current circuit with an existing alternating current. For example, the connector arrangement may be used to connect an alternator driven by a Stirling engine to an alternating current mains electricity supply. The connector arrangement includes a circuit with an adjustable resonant frequency, adjustable between a first resonant frequency tuned to an initial operating frequency of the prime mover and a second resonant frequency detuned to the initial operating frequency. This adjustable resonant frequency is beneficial as it allows operation to be tailored to the exact operating conditions of the prime mover that is likely to have its own resonant frequency that may vary according to its operating condition.

37 Claims, 9 Drawing Sheets

APPARATUS FOR CONNECTING A PRIME MOVER DRIVEN ALTERNATOR TO A CIRCUIT WITH AN EXISTING ALTERNATING CURRENT

CROSS REFERENCE TO RELATED APPLICATIONS

The present application claims priority to Great Britain Patent Application No. GB 0402587.0, filed Feb. 5, 2004, which application is incorporated herein fully by this reference.

TECHNICAL FIELD

The present invention relates to apparatus for connecting a prime mover driven alternator to a circuit with an existing alternating current. The present invention also relates to a method of operating such a circuit and to a method of connecting and disconnecting a prime mover driven alternator to such a circuit. In particular, the present invention relates to an alternator driven by a Stirling engine to be connected to an alternating current mains electricity supply.

BACKGROUND OF THE INVENTION

Apparatus for connecting a Stirling engine driven alternator to an ac mains supply is disclosed in International Patent Application No. PCT/GB01/00840. FIG. 1 of that application is reproduced herein as FIG. 1 and shows a linear alternator 10 that is driven by a Stirling engine (not shown). The mains supply is shown at 20 between neutral 21 and live 22. The alternator 10 is connected between neutral 21 and live 22 through two parallel paths 30 and 40. The first electrical path 30 has a switch 31 and a meter 32 in series. The second electrical path 40 has a first impedance 41, a second impedance 42, a switch 43 and a meter 44 connected in series in that order. A line 50 extends between impedances 41 and 42 to connect to neutral 21 via two switches 51 and 52.

In order to connect the alternator 10 to the mains supply 20, the Stirling engine must first be initiated to reach a threshold temperature before the alternator 10 may be connected to the main electricity supply 20 to initiate the piston of the Stirling engine. Connection to the mains supply 20 is achieved through a sequence of stages corresponding to various arrangements of the switches 31, 43, 51 and 52. In particular, the switch 43 allows the alternator 10 to be connected to the mains supply 20 initially through impedances 41 and 42 thereby limiting the current passing through the alternator 10. This ensures that an appropriate force is exerted on the piston of the Stirling engine to initiate its stroke, i.e. a sufficient force is provided to initiate the movement but that is not so large as to cause the piston to be driven into the walls of the piston chamber. The engine may then be connected directly to the mains supply 20 through path 30. The alternator 20 is disconnected from the mains supply only after the alternator 10 is stalled by placing impedance 41 across live 22 and neutral 21.

Whilst the above design works well, we have developed improvements thereto.

SUMMARY OF THE INVENTION

According to a first aspect, the present invention resides in a connector arrangement operative to connect a prime mover driven alternator to an alternating current circuit with an existing alternating current, wherein the connector arrangement includes a circuit with an adjustable resonant frequency, adjustable between a first resonant frequency tuned to an initial operating frequency of the prime mover and a second resonant frequency detuned to the initial operating frequency.

Provision of an adjustable resonant frequency in the adjustable circuit of the connector arrangement is beneficial as it allows operation to be tailored to the exact operating conditions of the prime mover that is likely to have its own resonant frequency that may vary according to its operating condition. Hence, the tuned circuit may be used initially before later switching to the circuit that is detuned relative to the initial starting conditions. For example, a Stirling engine may be used as a prime mover and, in this case, it has been found that use of a tuned circuit is beneficial during cold starts, particularly when compared to the prior art circuit of FIG. 1. The use of a tuned circuit during a cold start is particularly beneficial because it minimises the effect of starting transients that may otherwise cause internal collisions, e.g. pistons against the displacer or the walls of the piston chamber. Furthermore, the use of a tuned circuit may lead to a reduction in the noise generated by the prime mover upon start up.

However, we have also realised that the use of a tuned circuit is not always beneficial during prolonged operation of the prime mover or even during the initial connection of the alternator to the alternating current circuit. We have found that the use of a detuned circuit can be beneficial in certain circumstances, for example where the prime mover is at an elevated temperature. This may correspond to restarting a Stirling engine soon after a previous shut down or a certain time period after initial start up of a Stirling engine where its temperature has begun to rise. Conveniently, the second resonant frequency is tuned to operation of the prime mover at normal working temperature. This provides better operation when the prime mover has warmed up and is operating at an elevated temperature.

Optionally, switching between tuned and detuned circuits may be implemented using a variable capacitance. For example, the connector arrangement may further comprise one or more capacitors operable to provide the connector arrangement with at least first and second capacitance values, the first capacitance value providing the tuned circuit and the second capacitance value providing the detuned circuit. Various combinations of capacitors are possible, for example using variable capacitances or using capacitors arranged in parallel on switchable paths. Preferred, but optional, capacitor arrangements are set out in the appended claims.

Optionally, the connector arrangement further comprises a switch operable to connect the alternator to the alternating current circuit. This facilitates easy connection and disconnection of alternator to and from the alternating current circuit.

Other preferred, but optional, features of the connector arrangement are set out in the appended claims.

From a second aspect, the present invention resides in a method of operating a connector arrangement connecting a prime mover driven alternator to an alternating current circuit with an existing alternating current, the method comprising the steps of monitoring a parameter of the prime mover and adjusting the resonant frequency of an adjustable circuit of the connector arrangement when the parameter passes through a threshold value.

Optionally, the parameter may be the time of operation of the prime mover (e.g. the time elapsed since starting the prime mover), a temperature of the prime mover or an internal pressure of the prime mover.

From a third aspect, the present invention resides in a method of connecting a prime mover driven alternator arranged to generate a current between two terminals to generate a current between two terminals to an alternating current circuit with an existing alternating current, the method comprising the steps of: (a) connecting an impedance of such a value between the terminals of the alternator that the prime mover arranged to drive the alternator substantially cannot move and cannot make the alternator generate a current; (b) initialising the prime mover so that it is in a suitable condition to drive the alternator at the frequency of the alternating current in the circuit to which it is to be connected; and (c) connecting the terminals of the alternator to a circuit with an existing alternating current to cause the alternator to start movement of the prime mover; and, concurrent with steps (b) and (c), monitoring a parameter of the prime mover, optionally one of the parameters mentioned above, and adjusting the resonant frequency of an adjustable circuit of the connector arrangement when the parameter passes through a threshold value.

A Stirling engine is preferably used as the prime mover as it can be initialised by being heated by an external heat source and then remain in a state ready to be brought into operation extremely quickly. Starting the Stirling engine only requires a small amount of energy since the pistons, which are the moving part, are relatively light and can be accelerated from rest very easily.

The Stirling engine is usually started by applying the alternating current from the circuit to which the prime mover driven alternator is to be connected, which is usually mains power, to the stator of the alternator through a suitable impedance to limit the inrush current and to bring the alternator closely into phase with the mains.

From a fourth aspect, the present invention resides in a method of disconnecting a prime mover driven alternator from an alternating current circuit with an existing alternating current comprising the steps of: (a) connecting an impedance in parallel with the prime mover driven alternator, the impedance having a sufficiently low impedance value to require a current in excess of that which the alternator is able to deliver to prevent the prime mover from driving the alternator and thus stalling the prime mover; and (b) disconnecting the alternator from the circuit with an existing alternating current; and, concurrent with steps (a) and (b), monitoring a parameter of the prime mover, optionally one of the parameters mentioned above, and adjusting the resonant frequency of an adjustable circuit of the connector arrangement when the parameter passes through a threshold value.

For any of the above methods, the step of adjusting the resonant frequency may optionally comprise adjusting between a first resonant frequency tuned to initial operation of the prime mover and a second resonant frequency detuned to initial operation of the prime mover. Optionally, the second resonant frequency is tuned to operation of the prime mover at normal working temperature.

By stalling the alternator before disconnecting it from the mains, the arcing caused when it is disconnected is substantially reduced.

Other preferred, but optional, features of the above methods are set out in the appended claims.

BRIEF DESCRIPTION OF THE DRAWINGS

An example that illustrates the present invention will now be described with reference to the accompanying drawings in which:

FIGS. 2*a* to 7*a* show a connector arrangement for connecting a Stirling engine driven alternator to a mains electricity supply according to an embodiment of the present invention, the different Figures showing various switching configurations;

FIGS. 2*b* to 7*b* show the corresponding circuits of FIGS. 2*a* to 7*a* as simplified equivalent circuit diagrams;

DETAILED DESCRIPTION OF A PREFERRED EMBODIMENT

Figure 1:
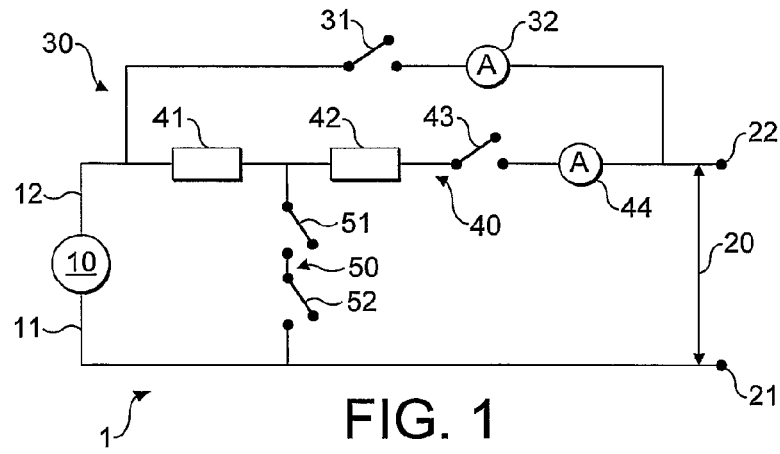
FIG. 1 shows a connector arrangement for connecting a prime mover driven alternator to a circuit with an existing alternating current according to the prior art.
Figure 2A:
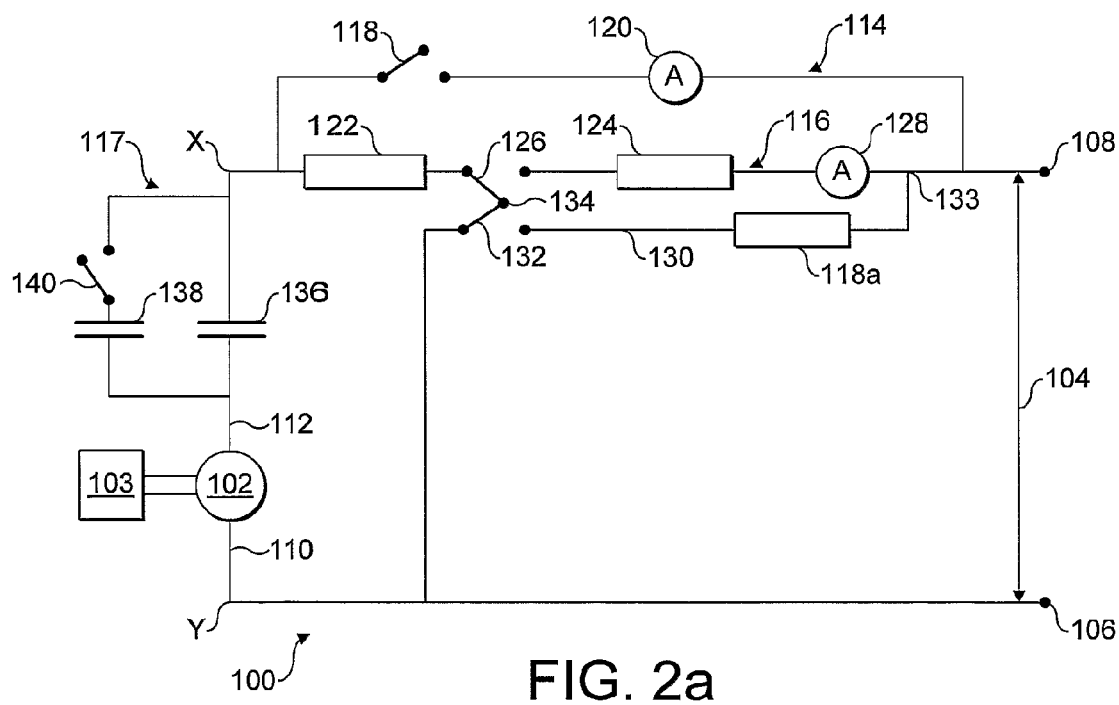

A connector arrangement 100 for connecting and disconnecting a prime mover driven alternator 102 to a circuit with a mains electricity supply 104 is shown in FIG. 2*a*. The connector arrangement 100 contains an alternator 102 that is driven by a Stirling engine 103 in this example. However, any other suitable prime mover such as a gas engine, internal combustion engine or a steam turbine would be suitable. Any suitable alternator may be used, as will be immediately evident to a person skilled in the art, although a linear alternator is presently preferred as it is found to work well with a reciprocating engine such as a Stirling engine 103. The mains electricity supply is shown at 104 and extends between neutral 106 and live 108: the mains supply 104 acts as a circuit with an existing alternating current.

The alternator 102 has two terminals 110 and 112, one of which 110 is connected to neutral 106. The other terminal 112 is connectable to the mains supply 104, via a capacitor arrangement 117, by two parallel paths 114 and 116. The capacitor arrangement 117 can be adjusted to provide a circuit with an adjustable resonance, thereby allowing the connector arrangement 100 to be tuned or detuned relative to the initial operating conditions of the Stirling engine 103, as will be described in further detail below. The first electrical path 114 comprises a relay switch 118 and a current meter 120 in series. The second electrical path 116 has a first impedance 122, a relay switch 126, a second impedance 124 and a current meter 128 in series in that order. In this example, the first impedance 122 is 27Ω and the second impedance 124 is 10Ω.

As can be seen from FIG. 2*a*, an electrical path 130 extends from beyond the meter 128 to connect the neutral 106 to path 116 at two connection points 133 and 134. Connection point 133 is located on the mains supply-side of electrical meter 128, whereas connection point 134 is located between impedances 122 and 124. A relay switch 132 is provided in the electrical path 130 adjacent connection point 134 such that the relay switch 132 provides an electrical connection between neutral 106 and live 108 at point 133 when in a closed position. The relay switch 126 in electrical path 116 is also located adjacent connection point 134. When closed, relay switch 126 completes the electrical path 116 connecting alternator 102 to live 108. The opposed arrangement of relay switches 126 and 132 shown in FIG. 2*a* and FIG. 8 is such that, when both are in their open positions, they complete the electrical path 130 from neutral 106 to live 108 via connection point 134.

Figure 8:
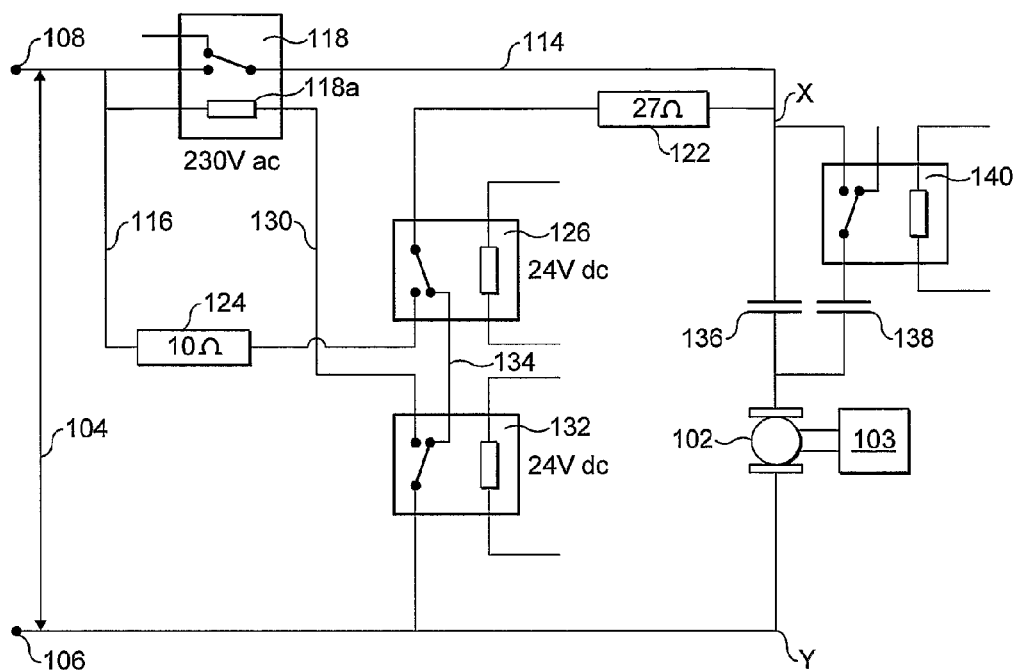
FIG. 8 is a further circuit diagram of the connector arrangement of FIG. 2*a* showing relay switches and better reflecting the physical arrangement of components.

FIG. 8 illustrates better the physical arrangement of the components of connector arrangement 100 and shows that electrical path 130 passes through a coil of the relay switch 118 such that the switch 118 is closed when a current flows through path 130 (via connecting point 133 only) to complete electrical path 114. The coil has an inherent impedance that is introduced into electrical path 130, as indicated at 118a.

Connection of the alternator 102 to the mains supply 104 will now be described.

The circuit shown in FIG. 2a is adopted when the Stirling engine 103 is idle and the alternator 102 is not connected to the mains supply 104. The circuit of FIG. 2a can be represented more simply by the circuit shown in FIG. 2b. The adjacent switches 126 and 132 are both open to connect neutral 106 and live 108 via connection point 134 such that the alternator 102 and capacitor 136 form a series circuit with the impedance 122. The impedance 122 is selected to be 27Ω as this is sufficient to ensure that the alternator 102 cannot produce enough current to pass through the impedance 122. Hence, the Stirling engine 103 is stalled and kept in a stationary condition.

To start operation, the Stirling engine 103 is brought into operating condition by applying heat to one end of its piston chamber whilst cooling the other end. When the engine 103 is sufficiently warmed up to achieve a steady state of operation, the alternator 102 may be connected to the mains supply 104. An engine 103 temperature of 180° C. is taken to indicate steady-state operation as measured by a temperature detector 144 (e.g. a thermocouple).

Figure 3A:
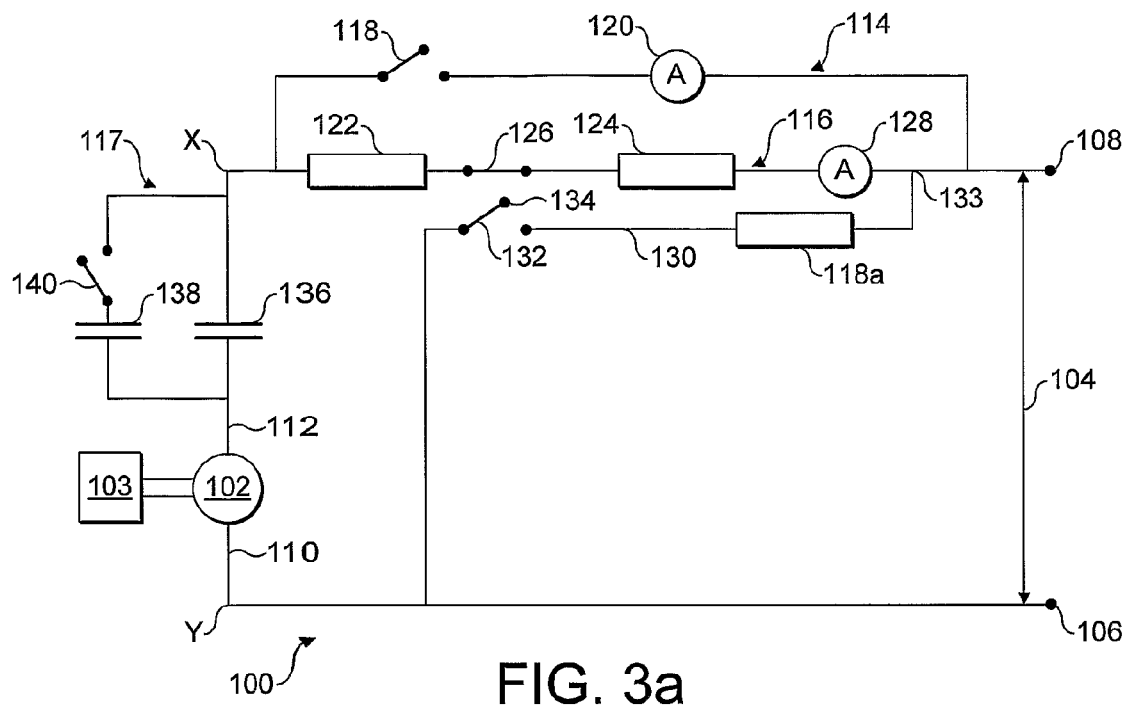
Figure 3B:
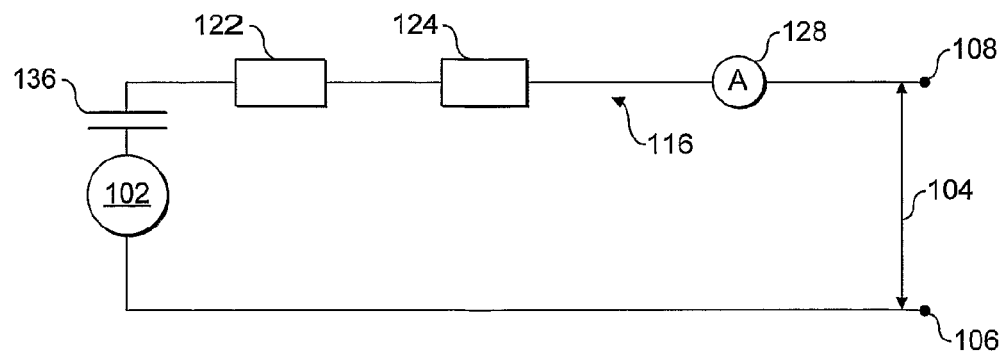

When it is desired to initiate the engine's piston by connecting the alternator 102 to the mains supply 104, the relay switch 126 is closed as shown in FIG. 3a to create an effective circuit as shown in FIG. 3b. The action of closing relay switch 126 breaks the electrical path connecting neutral 106 and live 108 via connection point 134, and instead completes electrical path 116 to connect the alternator 102 and capacitor 136 to the mains supply 104 via impedances 122 and 124 and meter 128. The particular total impedance value of the impedances 122 and 124 is selected dependant upon the particular Stirling engine 103 and alternator 102 combination that is used. In the present example, the total impedance has been selected at 37Ω. This dictates the current supplied from the mains 104 that passes through the coils of the alternator 102 and, in turn, dictates the force imported to the moving portion of the alternator 102 within the coils (in this case, the moving portion is the piston of the Stirling engine 103). The force imparted must be sufficient to start movement of the piston and yet must not be so excessive to drive the piston beyond its designed range of movement as this may damage the alternator 102 or Stirling engine 103.

The connection arrangement 100 of the present invention is particularly suitable for use with a Stirling engine 103 as the prime mover of the alternator 102 because the Stirling engine 103 can be brought into operation rapidly and will then remain in a steady state ready for connection of the alternator 102 to the mains supply 104. Furthermore, starting the Stirling engine 103 by initiating the piston stroke using the mains supply 104 only requires a small amount of force because the piston is relatively light and can be accelerated from rest very easily. The piston stroke is continued during normal operation of the engine 103 by linear simple harmonic motion and is driven by the alternating current of the mains supply 104.

Heating the Stirling engine 103 prior to connection to the mains supply 104 ensures that the alternator 102 produces electricity of a suitable power quality for the mains electricity supply 104. Using the alternating current of the mains supply 104 to initiate the piston stroke ensures the alternator 102 is driven at the same frequency and in phase with the mains supply 104.

The current meter 128 provided in electrical path 116 gives an indication of the current that flows through line 116 upon connection. After connection, the current measured by meter 128 is checked to ensure that it is within expected values. This check provides an indication that the impedances 122 and 124 and contact of the relay switches 118, 126, 132 and 140 are working satisfactorily. The current measured by meter 128 is read by a controller 142 that compares it with expected values to ensure that the connector arrangement 100 is functioning correctly. If the measured value is outside the expected values, the controller 142 performs an emergency shut-down procedure as is described later.

Under normal circumstances, the reading of meter 128 will be within expected values and so the controller 142 causes switch 132 to close to connect neutral 106 to line 108 along electrical path 130 via connection point 133. This switching operation produces the circuit shown in FIGS. 4a and 4b. The controller 142 makes the switching operation only after a delay of 500 ms after the previous switching operation.

Figure 4A:
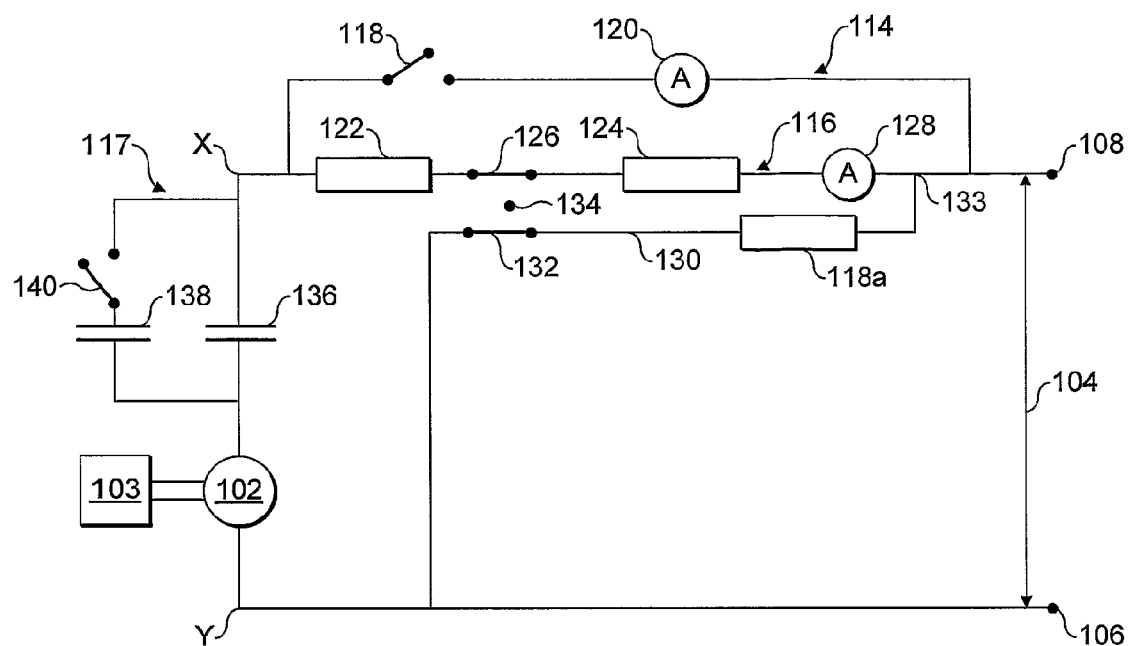
Figure 4B:
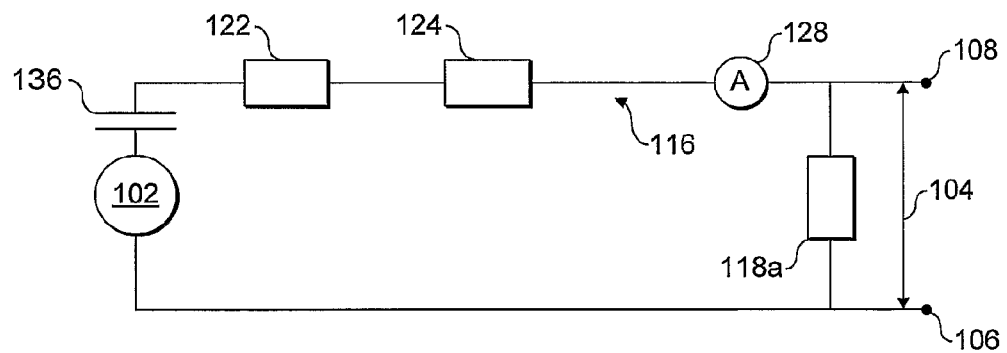
Figure 5A:
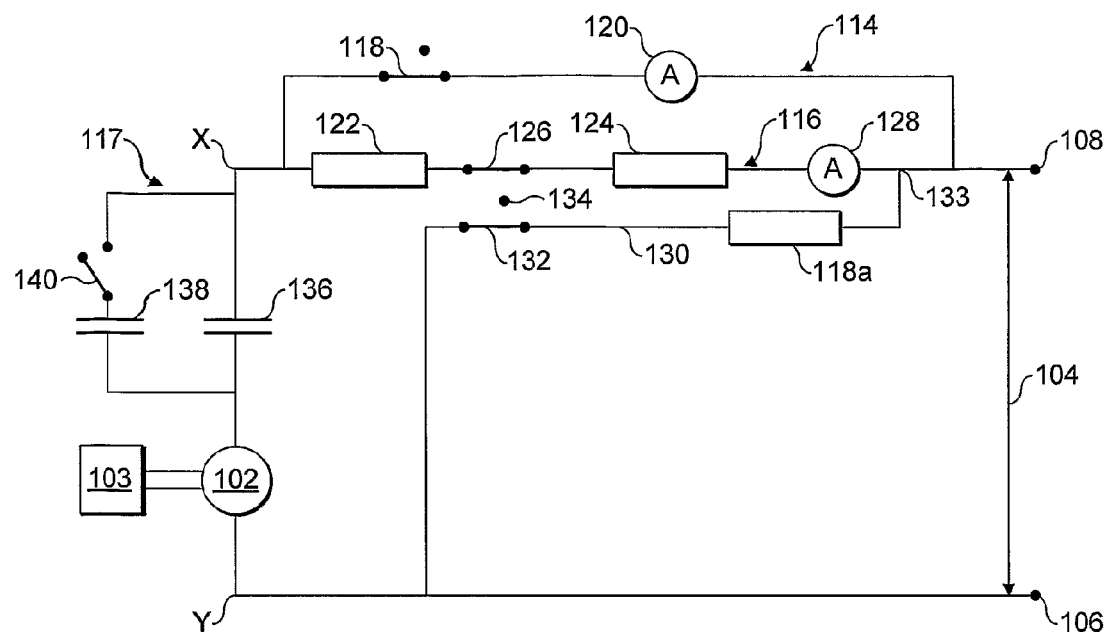
Figure 5B:
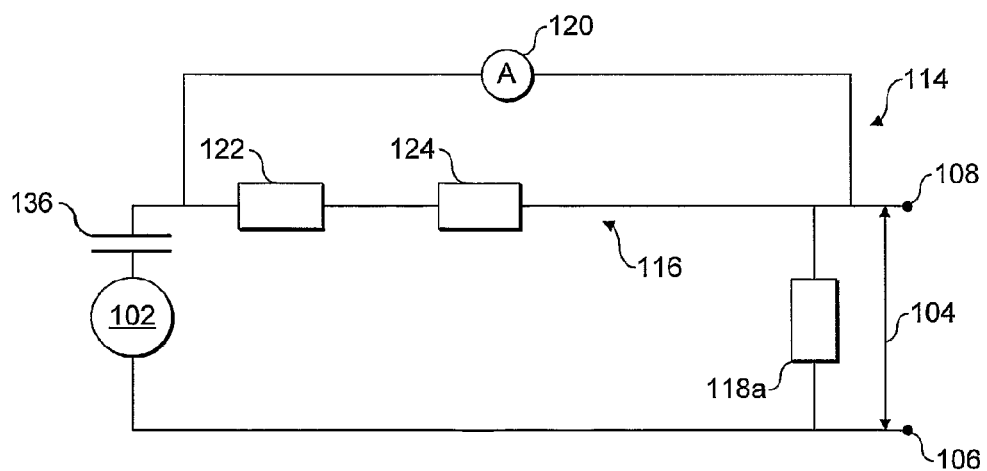

As was explained above, passing a current along the electrical path 130 from connection point 133 activates the relay switch 118 causing switch 118 to close, thereby producing the circuit shown in FIGS. 5a and 5b. The relay switch 118 closes after only a short delay and hence the circuit of FIGS. 4a and 4b is merely transitory. Closing switch 118 completes the electrical path 114 that links alternator 102 and capacitor 136 to mains electricity supply 104 and shorts out impedances 122 and 124. After a suitable period of time has elapsed for the current through line 114 to settle (e.g. 100 ms), the current through meter 120 is checked by the controller 142 to see whether it is within expected values. If it is not, the controller 142 initiates emergency shut-down procedures as are described below.

Figure 6A:
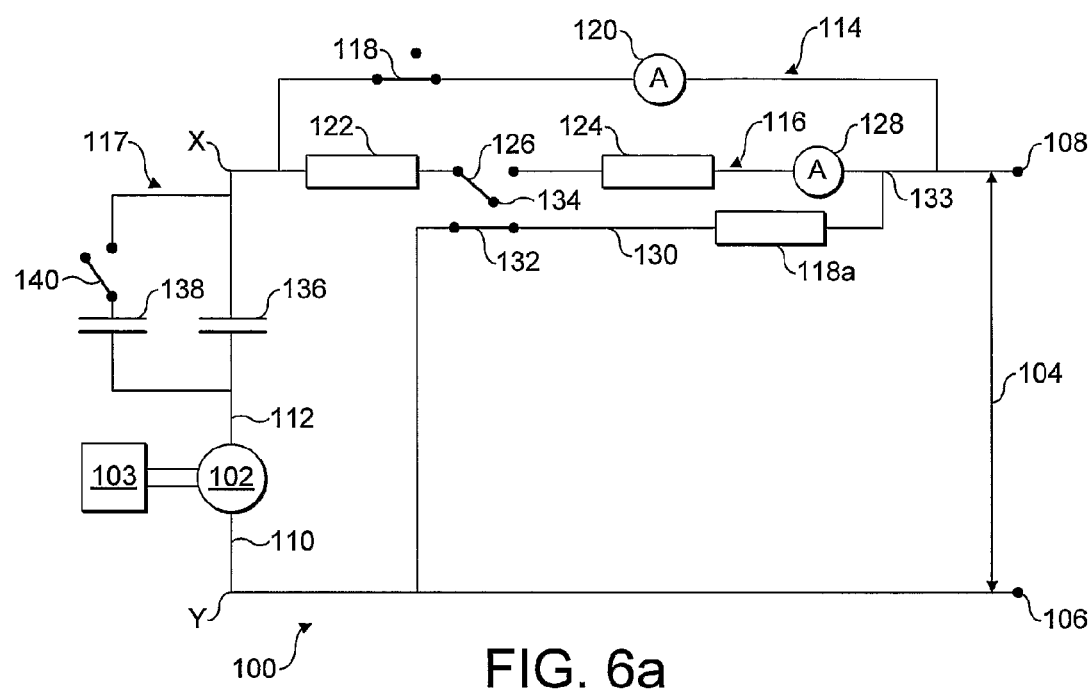
Figure 6B:
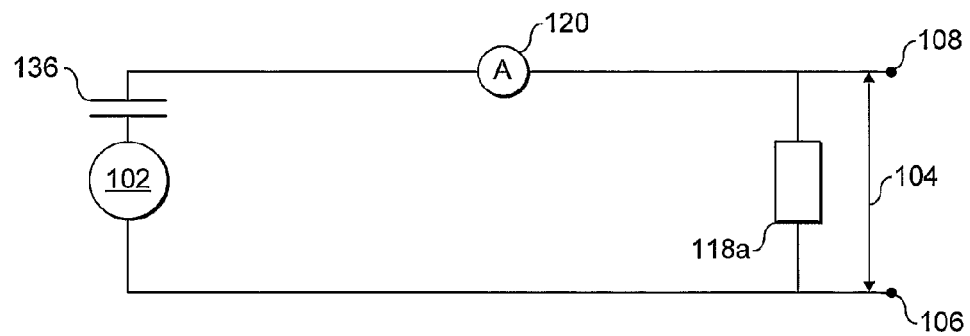

Under normal circumstances, the current will be within normal parameters and the controller 142 causes switch 126 to open to break electrical path 116 that includes impedances 122 and 124. Thus, the alternator 102 is now connected directly to the mains supply 104 as shown in FIGS. 6a and 6b. The impedance 118a in electrical path 130 is such that there is only negligible current flow along the path 130, such that the path 130 does not short out the alternator 102.

With alternator 102 connected to the mains supply 104 in this way, normal operation of the Stirling engine 103 may continue with the alternator 102 supplying electricity to or drawing electricity from the mains supply 104, as conditions dictate.

Figure 9:
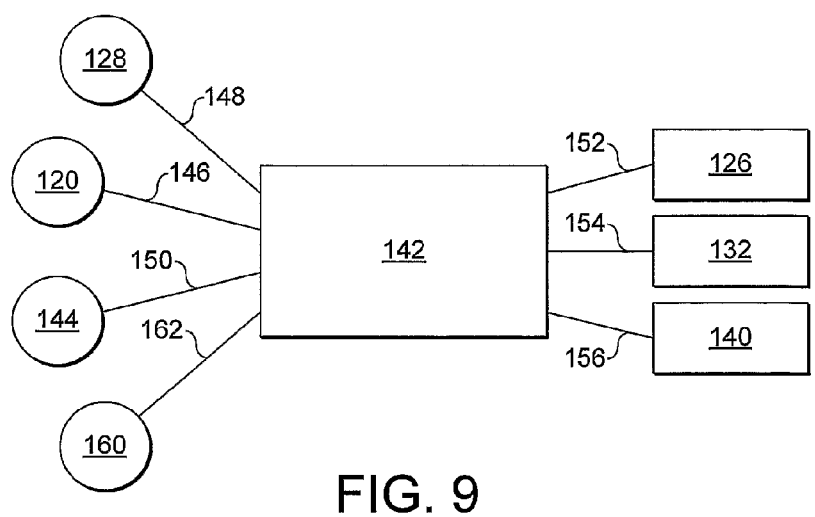
FIG. 9 shows a control system for controlling the relay switches in the connector arrangement.

As described above, operation of the connector arrangement 100 is managed by the controller 142 that may be a micro-processor or the like. The controller 142 is shown in FIG. 9 and is provided with data links 146, 148 to meters 120 and 128 respectively and a data link 150 to the temperature detector 144 of the Stirling engine 103. The controller 142 also has actuation links 152, 154 and 156 to the relay switches 126, 132 and 140 respectively. The actuation links 152, 154 and 156 supply 24V signals to activate the relay switches 126, 132 and 140.

Figure 10:
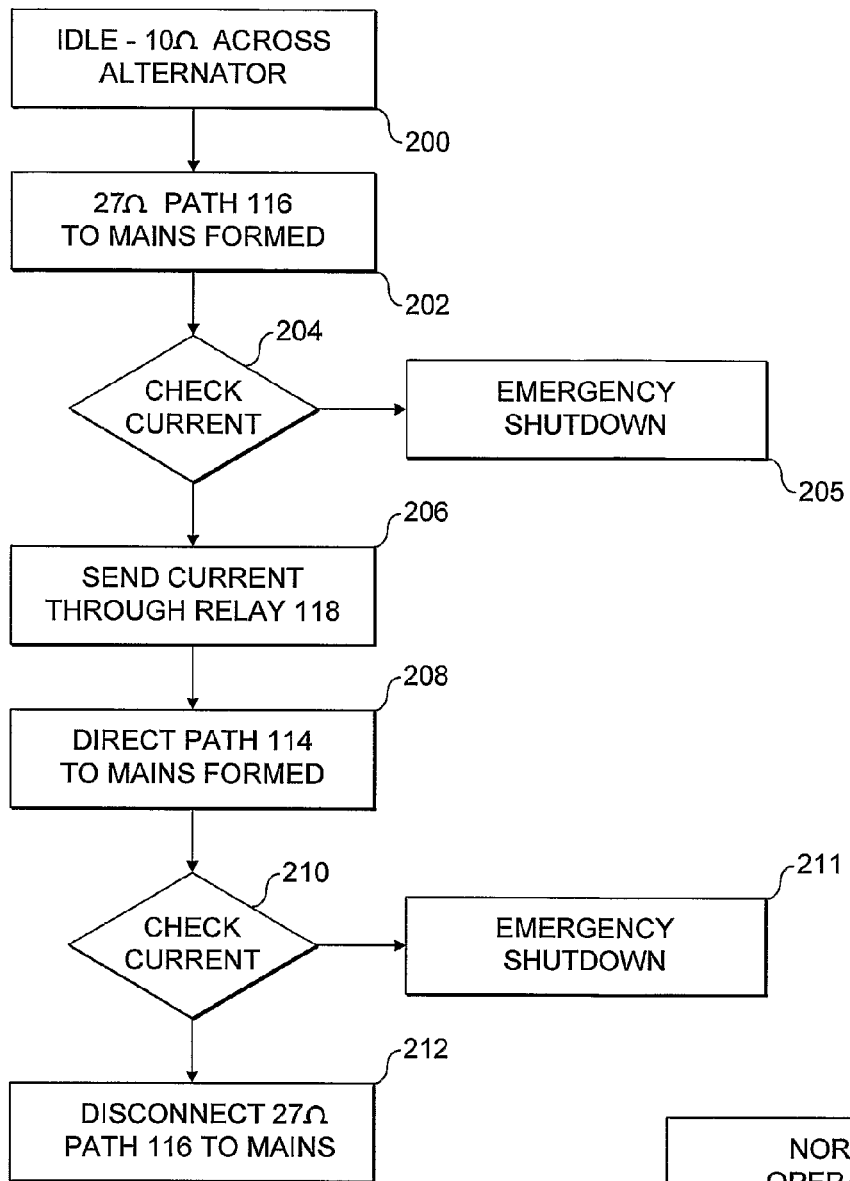
FIG. 10 shows a sequence that is followed by the control system to connect the alternator to the mains supply.

The controller 142 manages switching of the connector arrangement 100 to connect the alternator 102 to the mains supply 104 as described above. This can be summarised as follows and as illustrated by FIG. 10.

Figure 2B:
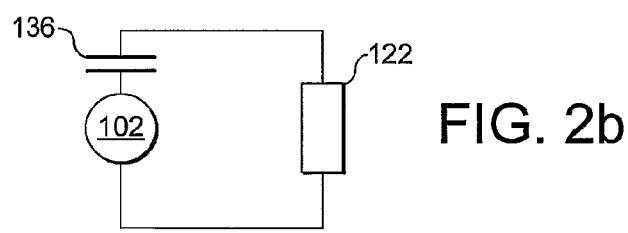

At 200, the Stirling engine 103 is idle and the alternator 102 and capacitor 136 are connected to impedance 122, as shown in FIGS. 2a and 2b. This corresponds to the following switching arrangement.

| | |
|---|---|
| Switch 118 | open |
| Switch 126 | open |
| Switch 132 | open |

Connection is initiated at 202, once the Stirling engine 103 has passed 180° C., by the controller 142 activating relay switch 126 to connect to the mains supply 104 via impedances 122 and 124 (as shown in FIGS. 3a and 3b). This corresponds to the following switching arrangement.

| | |
|---|---|
| Switch 118 | open |
| Switch 126 | open → closed |
| Switch 132 | open |

At 204, the current flowing through meter 128 is checked. If abnormal, an emergency shut-down is performed at 205. If normal, the controller 142 closes switch 132 at 206, after a 500 ms delay, to produce the circuit of FIGS. 4a and 4b thereby sending current to relay 118. This transitory circuit corresponds to the following arrangement.

| | |
|---|---|
| Switch 118 | open |
| Switch 126 | closed |
| Switch 132 | open → closed |

Current flow through relay 118 causes its switch to close after a short delay, thereby forming a short-circuit path 114 to the mains supply 104 as shown in FIGS. 5a and 5b, and as indicated at 208 of FIG. 10. This corresponds to the following arrangement.

| | |
|---|---|
| Switch 118 | open → closed |
| Switch 126 | closed |
| Switch 132 | closed |

At 210, the current flowing through meter 120 is checked. If abnormal, an emergency shut-down is performed at 211. If normal, and after a delay of 100 ms, the controller 142 opens switch 126 at 212 to break electrical path 116 through impedances 122 and 124. The alternator 102 is now connected directly to the mains supply 104, as shown in FIGS. 6a and 6b. This corresponds to the following switching arrangement.

| | |
|---|---|
| Switch 118 | closed |
| Switch 126 | closed → open |
| Switch 132 | closed |

The controller 142 also manages disconnection of the alternator 102 from the mains supply 104, as will now be described.

When it is desired to disconnect the alternator 102 from the mains supply 104, the heater of the Stirling engine 103 is turned off and the remaining heat in the Stirling engine 103 is used up with the connector arrangement 100 remaining as shown in FIGS. 6a and 6b.

Figure 7A:
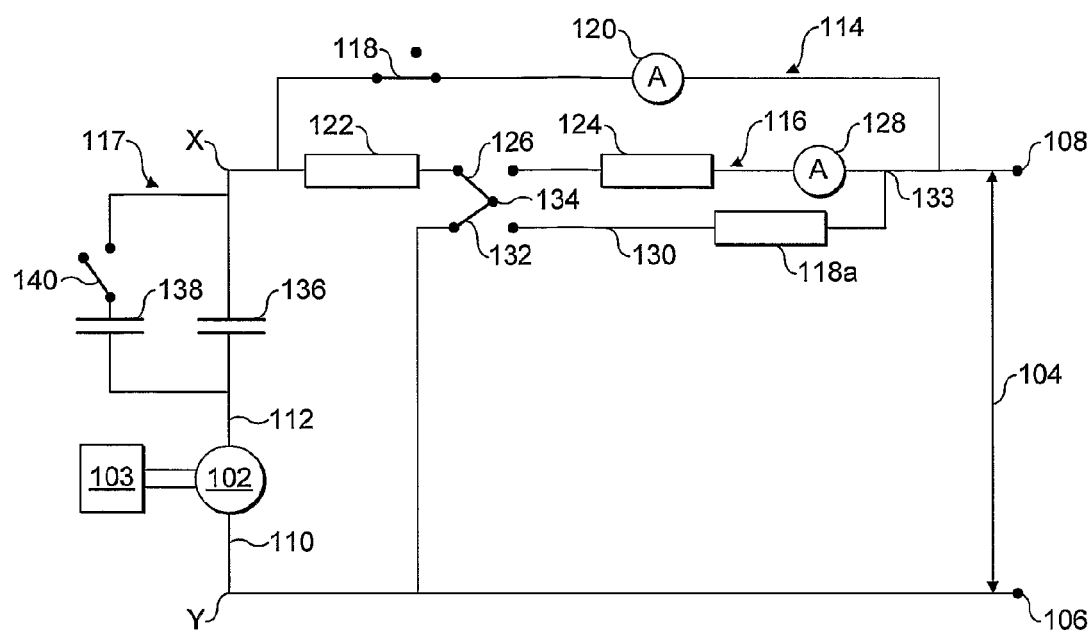
Figure 7B:
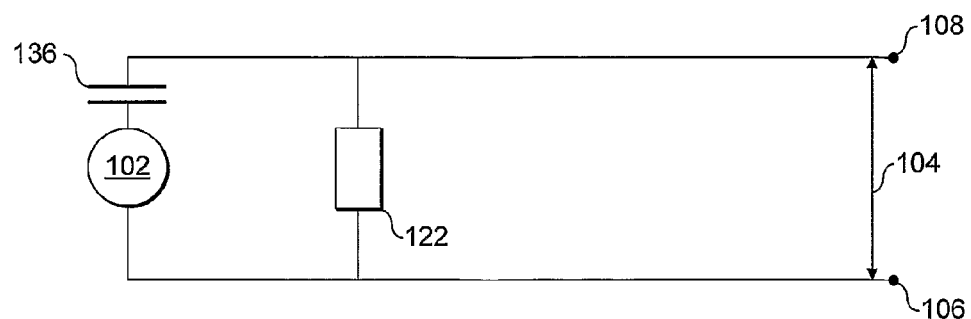

When the Stirling engine 103 drops below a critical temperature, the alternator 102 starts drawing power from the mains supply 104 rather than supplying it as is well known in Stirling engine 103 operation. The temperature detector 114 provided on the Stirling engine 103 is connected to the controller 142 and so enables the controller to determine when this critical temperature is reached. In the Stirling engine 103 used in the present example, this critical temperature is 160° C. The controller 142 then opens the switch 118 such that the circuit shown in FIGS. 7a and 7b is realised. The impedance 122 is placed across the alternator 102 once more, causing the Stirling engine 103 to stall because it cannot produce sufficient current to be driven through the impedance 122.

Opening switch 118 breaks the electrical path from connection point 133 that activates relay switch 118. Hence, after a short demagnetisation delay, the switch 118 opens to disconnect the alternator 102 from the mains supply 104. This returns the connector arrangement 100 to the state shown in FIGS. 2a and 2b. Substantially less or no arcing is produced upon disconnection because the demagnetisation delay ensures that the alternator 102 has already stopped.

Figure 11:
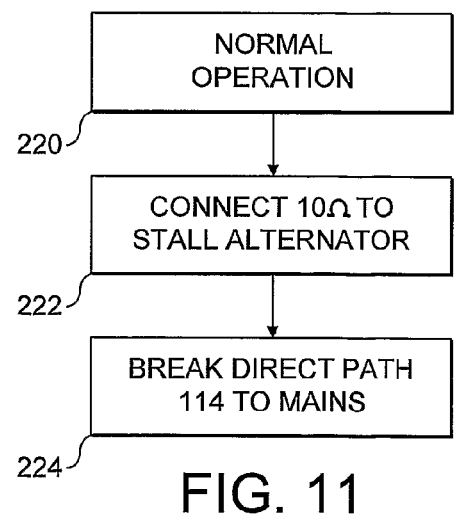
FIG. 11 shows a sequence of steps followed by the control system to disconnect the alternator from the mains supply.

The disconnection procedure can be summarised as follows and is illustrated in FIG. 11.

Initially, the connector arrangement 100 is configured for normal operation as shown in FIGS. 6a and 6b and as indicated at 220 of FIG. 11. This corresponds to the following switching arrangement.

| | |
|---|---|
| Switch 118 | closed |
| Switch 126 | open |
| Switch 132 | closed |

The controller 142 than opens switch 132 at 222 to produce the circuit shown in FIGS. 7a and 7b. This places impedance 122 across the alternator 102 thereby stalling the alternator 102, and stops current flowing through relay 118. This corresponds to the following switching arrangement.

| | |
|---|---|
| Switch 118 | closed → open |
| Switch 126 | open |
| Switch 132 | closed |

Lack of current passing through the relay 118 causes its switch 119 to open at 224 after a short demagnetisation delay, thereby disconnecting the alternator 102 from the mains supply 104. The delay is sufficient to ensure that the alternator 102 has stopped prior to disconnection. This produces the circuit shown in FIGS. 2a and 2b, and corresponds to the following switching arrangement.

| | |
|---|---|
| Switch 118 | open |
| Switch 126 | open |
| Switch 132 | closed → open |

The above disconnection procedure corresponds to a controlled sequence of steps spread over a period of time. However, disconnection may be required more rapidly in an emergency situation, for example because the current detected at meters 120 or 128 is outside the normal values. In such an emergency situation, switch 132 is closed without waiting for the remaining heat from the Stirling engine 103 to be used up. This should prevent the alternator 102 from suffering any damage due to operation outside its normal conditions. The remainder of the disconnecting procedure is as explained above.

Figure 12:
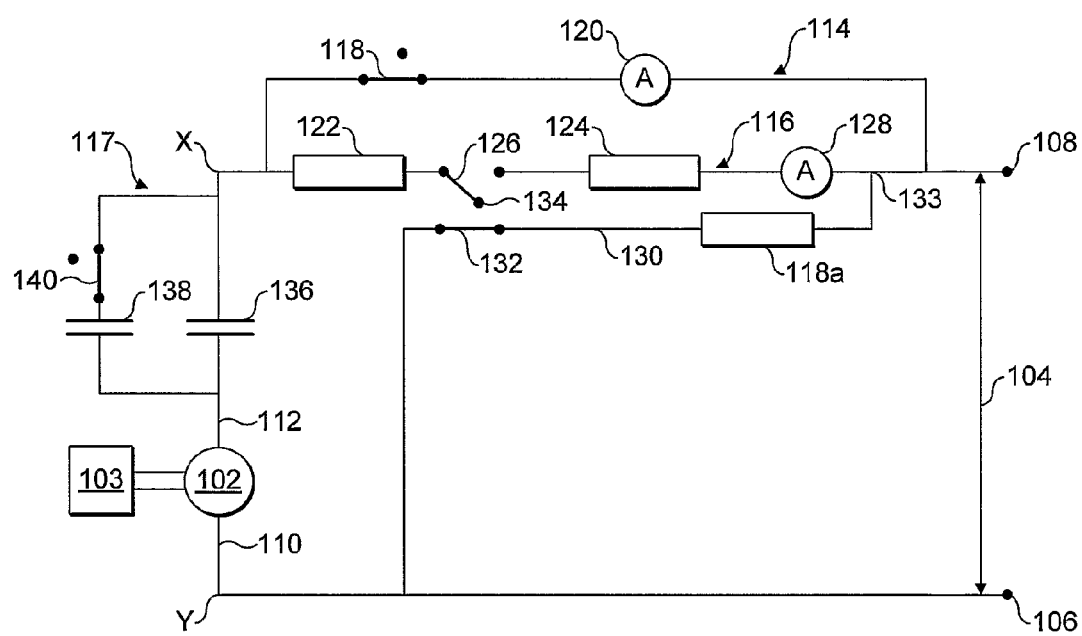
FIG. 12 corresponds to FIG. 6*a* but shows an arrangement corresponding to a detuned circuit.

As mentioned above, an adjustable capacitor arrangement 117 is placed on the live-side of the alternator 102 to provide an adjustable resonance that allows the circuit to be tuned or detuned relative to the initial operating frequency of the Stirling engine 103. The capacitor arrangement 117 comprises a first capacitor 136 placed in series and adjacent to the alternator 102, and a second capacitor 138 and relay switch 140 placed in parallel around the first capacitor 136. The capacitances of the first 136 and second 138 capacitors are 40 µF and 5 µF respectively. With switch 140 open, as shown in FIGS. 2a to 7a, current may flow through the first capacitor 136 only and so the alternator 102 sees a capacitance of 40 µF: this corresponds to a circuit between points X and Y that is tuned to the operating frequency of the Stirling engine 103 when started from cold. With switch 140 closed, as shown in FIG. 12, current may flow through both first 136 and second 138 capacitors and so the alternator 102 sees a capacitance of 45 µF: this corresponds to a circuit between points X and Y that is detuned relative to the initial operating frequency of the Stirling engine 103, but that is tuned to the operating frequency of the Stirling engine 103 when at its normal working temperature.

We have found that it is best to use a circuit for connecting the alternator 102 to the mains supply 104 upon starting the Stirling engine 103 from cold conditions that is tuned to these cold conditions. Such a circuit corresponds to switch 140 being open as shown in FIG. 2, that is with the impedance 122 across the alternator 102 to keep the Stirling engine 103 stationary and with switch 140 open to provide a tuned circuit when connection is desired. Such a tuned circuit provides minimal residual inductance between points X and Y. We have found this to be beneficial as it reduces starting transients that may otherwise cause internal collisions of the piston and displacers of the Stirling engine 103 during connection to the mains supply 104. Transients occur during start-up in cold conditions due to an increase in the helium pressure in the Stirling engine 103 that accompanies heating of the engine 103. The pressure rise causes the resonant frequency of the gas spring that ensures reciprocating motion of the piston to change. It is the resonant frequency of the gas spring that determines the frequency of the signal produced by the alternator 102.

However, we have also found that in order to maintain stable operation of the Stirling engine 103 when connected to the mains supply 104, particularly where the engine 103 temperature is high, use of a detuned circuit that is detuned relative to the initial operating frequency of the Stirling engine 103 is beneficial. Preferably, the resonant frequency may be adjusted such that it follows the resonant frequency of the Stirling engine 103 as it comes up to working temperature. This is achieved by increasing the capacitance between points X and Y.

In one embodiment of the present invention, the time elapsed since operation of the Stirling engine 103 was first started by heating the engine 103 is counted with a timer 160. The timer 160 is connected to the controller 142 via a data link 162. Obviously, the temperature of the engine 103 rises during this period and passes 180° C. such that connection of the alternator 102 to the mains supply 104 is initiated. When seven minutes has elapsed, operation in tuned-circuit mode is switched to operation in detuned-circuit mode.

Similarly, operation of the switch 140 is performed during the disconnection process to switch from detuned operation to tuned operation. Whilst this can be performed using a fixed time delay from when the heater of the Stirling engine 103 is turned off, it is presently preferred to operate switch 140 when the engine head temperature passes through a set temperature of 200° C. as measured by the temperature detector 144. It will be remembered from above that switch 132 is closed only when the engine head temperature drops to 160° C., so the connector arrangement 100 is already set to tuned circuit mode when the disconnection process begins.

It will be evident to the skilled person that variations may be made to the above embodiment without departing from the scope of the claims.

For example, the above embodiment uses a timer to count the time elapsed since starting the Stirling engine 103 and that causes the controller 142 to trigger the switch from tuned to detuned relative to the initial operating conditions of the Stirling engine 103. However, other parameters could by used such as the engine's internal pressure e.g. the pressure of the working gas (Helium), of the engine 103 or any other signal related to the natural frequency of the Stirling engine 103. Alternatively, the temperature of the Stirling engine 103 that is measured directly by temperature detector 144 may be used to trigger switching between tuned and detuned operation.

Specifically, the controller 142 periodically reads the temperature measured by the temperature detector 144 located in the Stirling engine 103 via the data link 150 every fifteen seconds. The controller 142 compares the temperature measured to a threshold temperature of 300° C. to determine whether the measured temperature is higher or lower than the threshold. The controller then compares this value with the current state of switch 140 and activates the switch 140 via actuation link 156 if necessary, according to the following logic table.

| TEMPERATURE | SWITCH STATE | ACTION |
| --- | --- | --- |
| low | open | none |
| high | open | close switch |
| high | closed | none |
| low | open | open switch |

This process is performed continuously and is wholly independent of the connection and disconnection procedures described above, i.e. operation of relay switch 140 by the controller 142 is independent of the operation of relay switches 118, 126 and 132. Exactly when the threshold temperature is reached is dependent upon several factors, such as the starting temperature of the Stirling engine 103 (as influenced by the ambient temperature or time elapsed since previous operation of the engine 103) and heat applied to the engine 103. Accordingly, operation of switch 140 may occur while the engine 103 is being heated prior to initiation of the piston with the connector arrangement 100 corresponding to FIG. 2a, connection of the alternator 102 to the mains supply 104 with the connector arrangement 100 corresponding to any of FIGS. 3a to 5a, or after connection is complete with the connector arrangement 100 corresponding to FIG. 6a. Similarly, operation of the switch 140 may occur during disconnection as the Stirling engine 103 is stopped and allowed to cool.

The above embodiment uses but merely one type of capacitor arrangement 117 that allows the capacitance between points X and Y to be varied. The choice of capacitance values can be varied to suit needs and other alternatives such as a variable capacitor at 138 or at 136 may be used. In fact, the capacitor arrangement 117 could be replaced by a single variable capacitor. Use of variable capacitors may be beneficial as this would allow flexible and continuous tuning of the connector arrangement 100 to the operating frequency of the Stirling engine 103 under all operating conditions, whilst giving rise to only minimal losses within the circuitry at all times. This may be implemented using a feedback loop, for example.

Moreover, using a variable capacitance is but only one way of switching the connector arrangement 100 between tuned and detuned operation. For example, an arrangement of inductors may be used in the place of capacitors such that the connector arrangement 100 is provided with a variable inductance rather than with a variable capacitance.

The values of impedances 122 and 124 are merely offered as examples and are in no way intended to be limiting. The values of impedances 122 and 124 may be freely varied.

The invention in its broadest sense applies to connection of a prime mover driven alternator to a circuit with an existing alternating current. As such, the Stirling engine 103 of the above embodiment is presented merely as an example of a prime mover that drives an alternator 102 and the mains supply 104 is but merely an example of a circuit having an alternating current.

The use of a mechanically activated switches is preferred, but not essential, to perform the shutdown sequence, rather than using an external timing device as it enables shut down to be performed even in the event of loss of supply. The connector arrangement 100 described above provides both a reliable mains supply connection and a safe instant disconnection in the event of a loss of the mains supply 104. The connector arrangement 100 is able to provide both connection and disconnection from the mains power supply 104 with the same components thus lowering the component count by providing dual functionality.

As well as using the full connector arrangement design, part of the connector arrangement may be used for a particular connection or disconnection application. For example, the disconnection circuit could be used for a stand alone generator and the connection circuit could be used for grid independent starting.

What is claimed is:

1. A connector arrangement operative to connect a prime mover driven alternator to an existing alternating current circuit having alternating current flow, comprising:
    a circuit with an adjustable resonant frequency, adjustable between
    a first resonant frequency tuned to
    an initial operating frequency of the prime mover and
    a second resonant frequency detuned from the initial operating frequency.

2. A connector arrangement according to claim 1, wherein the second resonant frequency is tuned to operation of the prime mover at normal working temperature.

3. A connector arrangement according to claim 2, further comprising one or more capacitors operable to provide the connector arrangement with at least first and second capacitance values, the first capacitance value providing the tuned circuit and the second capacitance value providing the detuned circuit.

4. A connector arrangement according to claim 3, wherein the one or more capacitors include a first capacitor connected in series with the alternator.

5. A connector arrangement according to claim 4, wherein the one or more capacitors include a second capacitor arranged along an electrical path extending in parallel around the first capacitor.

6. A apparatus according to claim 5, wherein the electrical path extending around the first capacitor includes a switch.

7. A connector arrangement according to claim 3, wherein at least one of the one or more capacitors is an adjustable capacitor.

8. A connector arrangement according to claim 1, further comprising a switch operable to connect the alternator to the alternating current circuit.

9. A connector arrangement according to claim 1, further comprising an impedance switchable into and out of parallel arrangement with the alternator, the impedance being of sufficiently low value that the prime mover cannot drive the alternator to produce a current passing through impedance when connected in parallel with the alternator.

10. A connector arrangement according to claim 9, further comprising a controller arranged to connect the impedance into a parallel arrangement with the alternator, arranged to disconnect the alternator from a parallel arrangement with the alternator and arranged to connect the alternator to the alternating current circuit.

11. A connector arrangement according to claim 10, wherein the controller is arranged to disconnect the impedance from a parallel arrangement with the alternator before it connects the alternator to the alternating current circuit.

12. A connector arrangement according to claim 11, wherein the controller is arranged to disconnect the impedance from a parallel arrangement with the alternator after it connects the alternator to the alternating current circuit.

13. A connector arrangement according to claim 9, wherein the alternator is connected to the alternating current circuit through an impedance.

14. A connector arrangement according to claim 13, including means to monitor the characteristics of the current passing through the impedance connected between the alternator and the alternating current circuit.

15. A connector arrangement according to claim 14, further comprising a switchable electrical path and wherein the controller is arranged to complete this switchable path to short circuit the impedance connected between the alternator and the alternating current circuit if the characteristics of the current passing through the impedance are within desired parameters.

16. A connector arrangement according to claim 1, wherein the prime mover driving the alternator is a Stirling engine.

17. A connector arrangement according to claim 1, wherein the alternator is a linear alternator.

18. A connector arrangement according to claim 1, wherein the alternating current circuit is a mains electricity supply.

19. A method of operating a connector arrangement connecting a prime mover driven alternator generate to an alternating current in a circuit having alternating current flow, the method comprising:
    monitoring a parameter of the prime mover and
    adjusting the resonant frequency of
    a circuit of the connector arrangement between
    a first resonant frequency tuned to
    an initial operating frequency of the prime mover and
    a second resonant frequency detuned from the initial operating frequency when the parameter passes through a threshold value.

20. A method according to claim 19, wherein the second resonant frequency is tuned to operation of the prime mover at normal working temperature.

21. A method according to claim 19, wherein the prime mover is a Stirling engine.

22. A method according to claim 19, wherein the alternator is a linear alternator.

23. A method of claim 19, wherein the step of monitoring the parameter comprises monitoring a parameter that is related to the operating frequency of the prime mover.

24. The method of claim 19 wherein the step of monitoring the parameter comprises measuring the temperature of the prime mover or the temperature of a coolant of the prime mover.

25. The method of claim 19, wherein the step of monitoring the parameter comprises measuring the time elapsed since the prime mover was started.

26. A method according to claim 19, wherein the step of adjusting the resonant frequency of the adjustable circuit comprises adjusting a capacitance.

27. A method of connecting a prime mover driven alternator arranged to generate a current between two terminals of an alternating current circuit having alternating current flow comprising:
    (a) connecting an impedance of a defined value between the terminals of the alternator that the prime mover arranged to drive the alternator cannot move and cannot make the alternator generate a current;
    (b) initializing the prime mover so that it is in a suitable condition to drive the alternator at the frequency of the alternating current in the circuit to which it is to be connected; and
    (c) connecting the terminals of the alternator to said existing current circuit to cause the alternator to start movement of the prime mover; and,
    concurrent with steps (b) and (c), monitoring a parameter of the prime mover and adjusting the resonant frequency of a circuit between a first resonant frequency tuned to an initial operating frequency of the prime mover and a second resonant frequency detuned from the initial operating frequency when the parameter passes through a threshold value.

28. A method according to claim 27, wherein the prime mover is a Stirling engine.

29. A method according to claim 28, in which the Stirling engine is initialised by supplying heat to one end of its piston chamber.

30. A method according to claim 27, in which the terminals of the alternator are connected to the alternating current circuit through an impedance.

31. A method according to claim 30, in which the impedance through which the terminals of the alternator are connected to the alternating current circuit is subsequently short circuited.

32. A method according to claim 27, in which after the terminals of the alternator are connected to the alternating current circuit, the characteristics of the current passing through that connection are checked to determine whether they are within expected parameters.

33. A method according to claim 31, in which the characteristics of the current passing through the short circuit are checked to determine whether they are within expected parameters.

34. A method according to claim 33, wherein if the characteristic of the current are outside expected parameters the alternator is disconnected from the alternating current circuit.

35. A method of disconnecting a prime mover driven alternator from an alternating current circuit with an existing alternating current flow comprising:
    (a) connecting an impedance in parallel with the prime mover driven alternator, the impedance having a sufficiently low impedance value to require a current in excess of that which the alternator is able to deliver to prevent the prime mover from driving the alternator and thus stalling the prime mover; and
    (b) disconnecting the alternator from the circuit with an existing alternating current; and,
    concurrent with steps (a) and (b), monitoring a parameter of the prime mover and adjusting the resonant frequency of a circuit between a first resonant frequency tuned to an initial operating frequency of the prime mover and a second resonant frequency detuned from the initial operating frequency when the parameter passes through a threshold value.

36. A method according to any of claim 35, wherein the prime mover is a Stirling engine.

37. A method according to claim 36, wherein the Stirling engine has a heater and the heater is turned off and heat in the Stirling engine is used up before the impedance is connected in parallel with the alternator to stall the Stirling engine.

* * * * *